United States Patent [19]

Kawamura et al.

[11] Patent Number: 5,252,899
[45] Date of Patent: Oct. 12, 1993

[54] NUMERICAL CONTROL SYSTEM

[75] Inventors: Hideaki Kawamura, Hachioji; Kentaro Fujibayashi, Musashino; Morimasa Sato, Hachioji, all of Japan

[73] Assignee: Fanuc Ltd, Minamitsuru, Japan

[21] Appl. No.: 877,394

[22] Filed: Apr. 30, 1992

Related U.S. Application Data

[63] Continuation of Ser. No. 427,847, filed as PCT/JP89/00223, Mar. 2, 1989, and published as WO 89/08874, abandoned.

[30] Foreign Application Priority Data

Mar. 9, 1988 [JP] Japan .................. 63-55758

[51] Int. Cl.$^5$ .................. G05B 19/18; G05B 19/10
[52] U.S. Cl. .................. 318/568.1; 318/567; 318/569; 364/474.11; 364/474.18
[58] Field of Search .................. 318/560–646; 364/474.01–474.32, 571.04, 200, 188–191, 900

[56] References Cited

U.S. PATENT DOCUMENTS

| | | | |
|---|---|---|---|
| 4,029,950 | 6/1977 | Haga | 364/474.31 X |
| 4,047,003 | 9/1977 | LaRocca et al. | 318/562 X |
| 4,069,488 | 1/1978 | Fiorenza et al. | 364/474.11 |
| 4,151,590 | 4/1979 | Azegami | 318/591 X |
| 4,262,336 | 4/1981 | Pritchard | 364/474.11 |
| 4,288,849 | 9/1981 | Yoshida et al. | 364/474.11 X |
| 4,344,127 | 8/1982 | McDaniel et al. | 318/569 X |
| 4,396,973 | 8/1983 | Imazeki et al. | 901/2 X |
| 4,400,771 | 8/1983 | Suzuki et al. | 364/200 |
| 4,415,965 | 11/1983 | Imazeki et al. | 901/2 X |
| 4,435,771 | 3/1984 | Nozawa et al. | 364/474.11 |
| 4,459,655 | 7/1984 | Willemin | 364/474.22 X |
| 4,471,457 | 9/1984 | Videki, II | 364/900 |
| 4,476,528 | 10/1984 | Matsumoto et al. | 364/200 |
| 4,550,375 | 10/1985 | Sato et al. | 364/474.11 |
| 4,571,674 | 2/1986 | Hartung | 364/200 |
| 4,608,645 | 8/1986 | Niwa et al. | 364/474.18 |
| 4,684,862 | 8/1987 | Rohrle | 364/474.11 X |
| 4,698,766 | 10/1987 | Entwistle et al. | 364/474.11 |
| 4,731,733 | 3/1988 | Knoll | 364/474.02 X |
| 4,803,613 | 2/1989 | Kametani et al. | 364/132 |
| 4,873,476 | 10/1989 | Kurakake et al. | 318/568.22 |
| 4,878,002 | 10/1989 | Heatzig et al. | 364/148 X |
| 4,882,670 | 11/1989 | Isobe et al. | 364/188 |
| 4,888,534 | 12/1989 | Kuchiki | 318/567 |
| 4,897,586 | 1/1990 | Nakata et al. | 901/20 X |
| 4,956,785 | 9/1990 | Kawamura et al. | 364/474.01 |
| 4,965,500 | 10/1990 | Mizuno et al. | 364/513 X |
| 4,979,106 | 12/1990 | Schneider | 364/200 |
| 4,996,658 | 2/1991 | Baker | 364/571.04 |
| 5,010,285 | 4/1991 | Kawamura et al. | 318/569 |

FOREIGN PATENT DOCUMENTS 0346487 12/1987 European Pat. Off.
2073460A 3/1981 United Kingdom.
2077459A 3/1981 United Kingdom.

OTHER PUBLICATIONS

Instruments and Control Systems, Advances In Motion Control, Aug. 1986, vol. 59, No. 9, pp. 27–33, Radnor, Pa., USA.

Primary Examiner—Paul Ip
Attorney, Agent, or Firm—Staas & Halsey

[57] ABSTRACT

A numerical control system for controlling a plurality of axes with a plurality of functional arrangements includes a controller bus (1) having a plurality of slots, a plurality of controllers (10, 20, 30) each of which can read, decode, and execute numerical control commands for a group of axes. The controllers are connected to the channel bus (1), and axis control modules (3, 4) for controlling a plurality of servomotors. The controllers (10, 20, 30) share processing operations and use common peripherals, making the numerical control system flexible.

13 Claims, 2 Drawing Sheets

NUMERICAL CONTROL SYSTEM

This application is a continuation of application Ser. No. 07/427,847, filed as PCT/JP89/00223, Mar. 2, 1989, and published as WO 89/08874, now abandoned.

CROSS-REFERENCE TO RELATED APPLICATIONS

This application is related to U.S. application Ser. Nos. 07/427,124, 07/427,846 and 07/425,175 which issued on Apr. 23, 1991.

BACKGROUND OF THE INVENTION

1. Field of the Invention

The present invention relates to a numerical control system having a plurality of controllers, and more particularly to a numerical control system having controllers for reading, decoding, and executing numerical control commands.

2. Description of Related Art

Numerical control systems generally have one functional arrangement for reading, decoding, and executing numerical control commands to control a plurality of axes. There has also been employed a numerical control system having a plurality of such functional arrangements for controlling a numerically controlled multiple-head lathe or the like which has a plurality of spindles. Such a numerical control system is essentially in the form of two numerical control apparatuses combined with each other, one for controlling a first spindle, an X1 axis, and a Z1 axis and the other for controlling a second spindle, an X2 axis, and a Z2 axis.

While the above numerical control system can control a numerically controlled lathe having two spindles, since it is merely a combination of two numerical control apparatuses, it suffers the following problems:

First, the numerical control system has an unbalanced processing capability. Although there is no problem when the task of the processor of one of the numerical control apparatuses and the task of the processor of the other numerical control apparatus are in equilibrium, i.e. each of the processors has the capacity to handle its task at roughly the same rate, when these tasks are brought out of equilibrium, the processors do not have the ability to accept and process tasks from another processor which is overtasked even though the processors may have the capacity to do so.

Secondly, the two numerical control apparatuses cannot access each other's data. The numerical control system has two functional arrangements, but the lathe which is to be controlled is a single machine. Even under conditions where the numerical control apparatuses are to operate on the same data, they are unable to do so because, they cannot access each other's data. The numerical control system therefore requires memory units which would otherwise be unnecessary, and the system cannot perform flexible control. Communication ports or the like are also required by the numerical control system to eliminate the above drawback.

Thirdly, the numerical control apparatus must be provided with common peripherals such as a CRT/MDI unit, a floppy disk, etc.

SUMMARY OF THE INVENTION

In view of the aforesaid problems of the conventional numerical control systems, it is an object of the present invention to provide a numerical control system having a plurality of controllers for reading, decoding, and executing numerical control commands.

According to the present invention, the above object can be achieved by a numerical control system for controlling a plurality of axes with a plurality of functional arrangements, comprising a controllers bus having a plurality of slots, a plurality of controllers for reading, decoding, and executing numerical control commands for a group of axes, the controllers being connected to the controllers bus, and an axis control module for controlling a plurality of servomotors.

One of the controllers is used as a master channel for controlling the entire numerical control system.

The controllers connected to the controllers bus process numerical control commands so that the processing capacities of the controllers are kept in equilibrium. The data of the controllers can be accessed by each other, and the controllers can use common peripherals.

DESCRIPTION OF THE PREFERRED EMBODIMENTS

An embodiment of the present invention will hereinafter be described with reference to the drawings.

Figure 1:
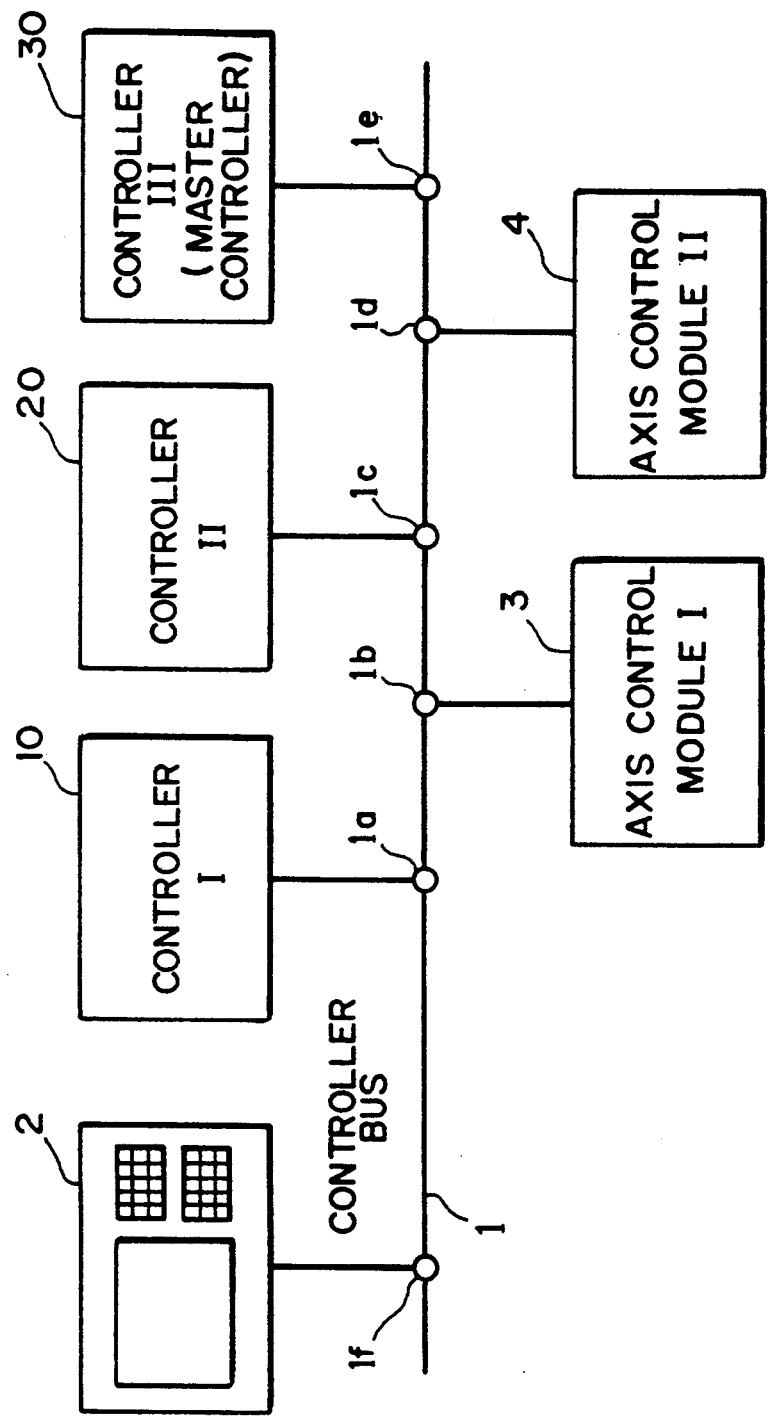
FIG. 1 is a block diagram of a numerical control system according to the present invention.

FIG. 1 shows in block form a numerical control system according to the present invention. A controller bus 1 comprises a multiple-channel master bus interconnecting a plurality of controllers. The channel bus 1 has a number slots $1a$, $1b$, ... $1f$ to which the controllers (described later) are connected.

A CRT/MDI unit 2 is connected to the slot $1f$. The CRT/MDI unit 2 can display data and graphic information for the numerical control system and also receive data from a keyboard thereof. The CRT/MDI unit 2 can be accessed by each of the controllers.

Axis control modules 3, and 4 are connected respectively to the slots $1b$, and $1d$. Each of the axis control modules 3, and 4 can control servomotors for 2 or 3 axes.

Controllers 10, 20, and 30 are connected respectively to the slots $1a$, $1c$, and $1e$. Each of the controllers has the functions of a conventional numerical control apparatus. Thus, one controller can read, decode, and execute numerical control commands. Additionally, each can control a component such as the CRT/MDI unit 2 or the like. Therefore, each individual controller can process commands for a certain number of axes processed by a conventional numerical control apparatus. For example, to control a numerically controlled lathe having two heads, the controller I 10 can control a first spindle, an X1 axis, and a Z1 axis, the controller II 20 can control a second spindle, an X2 axis, and a Z2 axis, and the controller III 30, as a master controller, can perform the control of the entire system for monitoring the other controllers. The master channel 30 can also control an axis control module, a spindle, etc. Each of the controllers 10, 20, and 30 can access the CRT/MDI unit 2.

These controllers 10, 20, and 30 are connected to the controller bus 1 and share their processing operation. If one of the controller runs short of its processing ability, part of the processing operation thereof is transferred to another controller. For example, while the controller I 10 is executing interpolation at very small intervals and the controller II 20 is executing linear interpolation, part of preprocessing operations for the interpolation carried out by controller I 10 may be executed by controller II 20. Therefore, the processing abilities of the channels can be balanced so that the processing operation will not be brought out of equilibrium.

The controllers can access data through controller bus 1. The CRT/MDI unit 2 connected to the slot 1f is supplied with display data from the controllers 10, 20, and 30. Input data entered from the keyboard of the CRT/MDI unit 2 are supplied to the controllers 10, 20, and 30.

The controller III 30 as a master controller performs the control of the entire system. Controller III 30 determine the priority for use of the bus 1 ad monitors the other controllers. If the number of tasks to be processed by the controller III 30 is increased to the point where it can no longer perform the control of the entire system, and any of the other controllers still has processing ability left, then the controller III 30 can transfer its master function to the other controller.

Although the axes to be controlled have heretofore been given in a fixed combination, they can be given in various combinations by connecting the above controllers 10, 20, and 30 to the controller bus 1. For example, the axes may first e combined such that the X1 axis and the Z1 axis are controlled by the controller I 10 and the X2 axis and the Z2 axis are controlled by the controller II 20. Then, when a different workpiece is to be machined, the axes may be combined such that the X1 axis, the Z1 axis, and the X2 axis are controlled by the controller I 10 and the Z2 axis is controlled by the controller II 20. By thus varying the combination of the axes to be controlled, the function of the machine tool being controlled is also varied.

The combination of the axes can be varied by varying the parameters or the like depending on the machine tool to be controlled. Commands for varying the axis combination may be inserted in a machining program. The axis combination may also be varied by using an external signal.

Through the use of such a numerical control system, it becomes possible to design a numerically controlled machine tool having a conceptually new mechanism.

Although not shown in FIG. 1, input/output units such as a floppy disk drive, a tape reader, a tape puncher a hard disk drive, etc. may be connected to the controller bus. These input/output units may be controlled by the controllers through the controller bus, and may receive and issue data for a machining program or the like. An interface to be connected to the communication circuit of a host computer or the like may also be connected to the controller bus and controlled by the controllers. Moreover, a spindle control circuit for controlling a spindle, a PC (programmable controller) of the built-in type, or the like may also be connected to the controller bus and controlled by the channels.

Figure 2:
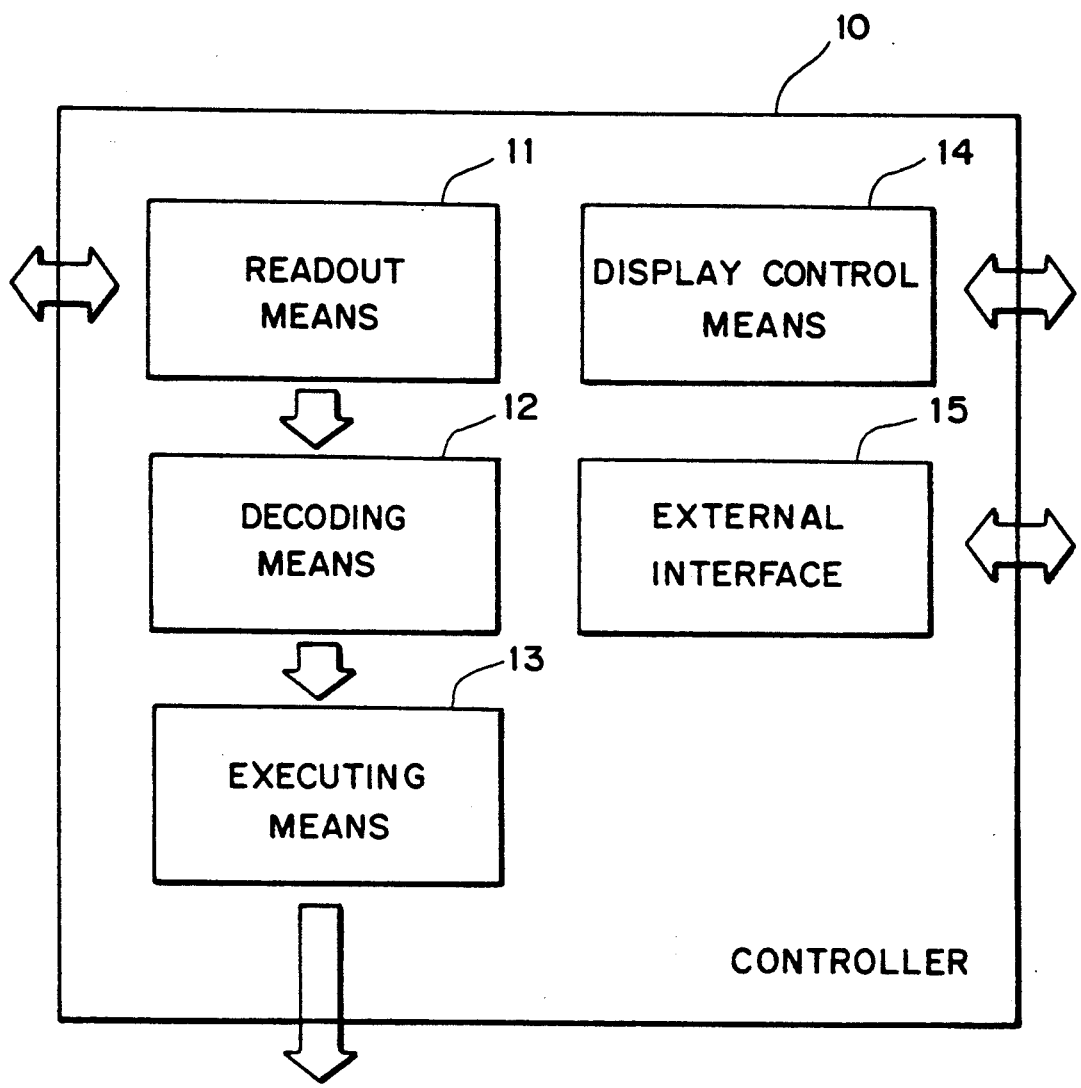
FIG. 2 is a block diagram showing the functions of a controller of the numerical control system.

FIG. 2 shows the functions of a channel in block form. Denoted at 10 is a controller and a readout means 11 for reading a machining program from an internal memory or an external memory of another controller.

The controller 10 has a decoding means 12 for decoding the machining program read by the readout means 11 and converting the program into a form that can be executed. The decoding means 12 effects preprocessing operations for the numerical control system. The preprocessing operations include the conversion of an absolute command value to an incremental value, offset calculations, and the conversion of a curve to be interpolated to a straight line. The decoding means 12 also processes axis control commands and other commands such as an MST function.

An executing means 13 interpolates the commands processed by the decoding means 12 and issues output pulses. The executing means 13 also issues contact outputs for the MST function, etc. These output signals are applied to the axis control modules or the PC directly or through the controller bus.

A display control means 14 supplies display data to the CRT/MDI unit 2 through the controller bus, and receives signals from the keyboard of the CRT/MDI unit 2.

An external interface 15 controls, through the controller bus, peripherals such as a floppy disk drive, a tape puncher, a tape reader, and a hard disk drive, for example. The external interface 15 can also control a communication interface connected to a host computer.

Each of the controllers may comprise a microprocessor system comprising a processor, a RAM, a ROM, and an interface. A portion of the RAM may be constructed as a bubble memory or a non-volatile memory backed up by a battery. The ROM may comprise an EPROM or EEPROM.

For an increased processing capability, a coprocessor, an MMU (memory management unit), or the like may be added to each of the controllers. With respect to hardware, one printed-circuit board may be used as one controller, and a suitable number of channels may be employed depending on the system construction, so that an economic numerical control system can be designed.

Since the controllers share the processing operation, can transmit and receive data through the control bus 1, and change their share of processing operations as needed, the numerical control system can provide control for various machine tools.

With the present invention, as described above, each controller has the function of a conventional numerical control apparatus, and the controllers are interconnected by a controller bus. Therefore, the decentralized processing capability is increased, each controllers data can be accessed by other controllers, and the CRT/MDI unit can be shared by the controllers.

The task to be processed by each controller can be varied by program commands, input signals, or parameters. Therefore, a flexible numerical control system can be constructed which depends upon the machine tool to be controlled.

What is claimed is:

1. A numerical control system for controlling a plurality of axes of a numerically controlled machine, comprising:
   a controller bus;
   a plurality of controllers, coupled to said controller bus, each of which can read, decode, and execute a numerical control command for a respective group of the plurality of axes in accordance with a selected one of a plurality of functional arrangements, each of the plurality of functional arrangements indicating particular groupings of the plurality of axes and corresponding controllers which are to control each particular grouping of the plurality of axes, a first one of the plurality of controllers capable of determining whether the first one of the plurality of controllers needs access to data which a second one of the plurality of controllers holds, the first one of the plurality of controllers being capable of alerting the second one of the plurality of controllers that the first one of the plurality of controllers needs access to the data which the second one of the plurality of controllers holds, and the second one of the plurality of controllers being capable of providing the first one of the plurality of controllers with the data in response to the alerting; and an axis control module connected to said controller bus, for controlling the plurality of axes in response to the numerical control command.

2. A numerical control system according to claim 1, further comprising:
a peripheral device coupled to said controller bus, for selecting the selected one of the plurality of functional arrangements using parameters, control programs, or external signals.

3. A numerical control system according to claim 1, wherein one of said plurality of controllers serves as a master controller for controlling a numerical control system, and wherein the master controller is used to monitor the other ones of said plurality of controllers.

4. A numerical control system according to clam 3, wherein said master controller can transfer a master function to one of the other ones of the plurality of controllers.

5. A numerical control system according to claim 1, further comprising:
a CRT/MDI unit connected to said controller bus, wherein each of said plurality of controllers includes a display control means for controlling the CRT/MDI unit.

6. A numerical control system according to claim 1, further comprising:
an input/output unit, coupled to said controller bus, including at least one of a floppy disk drive, tape reader, tape puncher, hard disk drive, host computer, spindle control circuit, and a programmable controller, and
wherein one of said plurality of controllers includes: an external interface for controlling the input/output unit.

7. A numerical control system according to clam 1, wherein each of said plurality of controllers comprises:
a processor,
a RAM,
a ROM, and
an interface which are mounted on a single printed-circuit board.

8. A numerical control system according to claim 7, wherein each of said plurality of controllers further comprises:
a coprocessor, and
a memory management unit.

9. A method for expanding a processing capability of a numerical control system for controlling a plurality of axes of a machine, the numerical control system including first and second controllers which process a plurality of tasks which relate to the controlling of the plurality of axes, comprising the steps of:
(a) selecting a functional arrangement which assigns the first controller to control a first group of the plurality of axes, and which assigns the second controller to control a second group of the plurality of axes;

(b) assigning a plurality of tasks to each of the first and second controllers to control the first and second groups, respectively;
(c) determining whether one of the plurality of tasks assigned to the first controller causes a processing capability of the first controller to be exceeded;
(d) determining whether the second controller has a processing capability when the processing capability of the first controller has been exceeded; and
(e) assigning the one of the plurality of tasks to the second controller when the second controller has processing capability and when the processing capability of the first controller is exceeded.

10. A method according to claim 9, further comprising the steps of:
(f) processing the one of the plurality of tasks with the second controller to generate a result; and
(g) returning the result of the one of the plurality of tasks of the second controller to the first controller whose processing capability was exceeded.

11. A method for reducing an amount of memory needed for a numerical control system for controlling a plurality of axes of a numerical control machine, the numerical control system having a plurality of controllers which each read, decode and execute numerical control commands, operate on data, and are operatively connected to each other by a controller bus, comprising the steps of:
(a) selecting a functional arrangement which assigns the first controller to control a first group of the plurality of axes, and which assigns the second controller to control a second group of the plurality of axes;
(b) providing the first and second controllers with data for control of the first and second groups;
(c) determining whether a first one of the plurality of controllers needs access to data which a second one of the plurality of controllers holds;
(d) alerting the second controller when said determining in said step (c) establishes that the first one of the plurality of controllers needs access to data which the second one of the plurality of controllers holds; and
(e) supplying the data from the second one of the plurality of controllers to the first one of the plurality of controllers when said determining in step (d) establishes that the first one of plurality of controllers needs access to data which the second one of the plurality of controllers holds.

12. A numerical control system for controlling first and second groups of servomotors of a numerically controlled machine, said numerical control system being supplied with first and second numerical control commands, said numerical control system comprising:
a controller bus;
a first controller operatively coupled to said controller bus and having a first processing capability, which receives, decodes and executes the first numerical control command including a first task and corresponding to the first group of servomotors to generate first machine control data, and which generates a first alarm signal when the first processing capability is exceeded;
a second controller operatively coupled to said controller bus and having a second processing capability, which receives, decodes and executes the second numerical control command corresponding to a second group of servomotors to generate second machine control data, and which receives and executes the first task in response to the first alarm signal when the second processing capability is not exceeded; and an axis control module operatively connected to said controller bus, which controls the first group of servomotors and the second group of servomotors in response to the first machine control data and the second machine control data, respectively.

13. A numerical control system according to claim 12,
   wherein the second numerical control command includes a second task,
   wherein the second controller generates a second alarm signal when the second processing capability is exceeded, and
   wherein the first controller receives and executes the second task in response to the second alarm signal when the first processing capability is not exceeded.

* * * * *